United States Patent Office 3,738,913
Patented June 12, 1973

3,738,913
METHOD OF PREPARING POLYPEPTIDES
Vernon L. Johnsen, La Grange, and Raymond S. Burnett and Eugene V. Matern, Chicago, Ill., assignors to Wilson Pharmaceutical & Chemical Corporation
No Drawing. Continuation-in-part of application Ser. No. 548,374, May 9, 1966, which is a continuation-in-part of application Ser. No. 301,970, Aug. 14, 1963, now abandoned. This application Sept. 11, 1970, Ser. No. 71,355
Int. Cl. C12d 13/06
U.S. Cl. 195—29      7 Claims

ABSTRACT OF THE DISCLOSURE

The method of producing the polypeptides of this invention deals with protein hydrolysis wherein a collagen-containing material is subjected to heat in the presence of aqueous solution having sulfite ions present, to produce a hydrolyzed protein solution of reduced gel-forming character having a Formol Nitrogen Value of the order of 6 or less, subjecting the hydrolyzed protein solution to anion exchange treatment and thereafter further hydrolyzing the proteins using proteolytic enzymes to produce a polypeptide product having a Formol Nitrogen Value in the range of 8 to 17, which polypeptides are useful for treatment of hair due to unique sorption characteristics.

---

This application is a continuation-in-part of application Ser. No. 548,374, filed May 9, 1966, and entitled Proteinaceous Cosmetic Material, now abandoned, which application was in turn a continuation-in-part of application Serial No. 301,970 entitled Proteinaceous Food Material and Method of Preparing Same, filed Aug. 14, 1963, and now abandoned.

This invention relates to a method of preparing polypeptide products from collagen-containing material. More particularly, it relates to a method of producing non-antigenic proteinaceous materials having utility in cosmetics such as for the treatment of skin and hair, with characteristics rendering the products uniquely suitable for use in the care of hair, i.e., hair grooming and cleansing compositions such as setting lotions, tonics, bleaches, shampoos, and the like.

In accordance with this invention, a method of converting the proteinaceous components of collagen-containing materials to non-antigenic polypeptides having unique absorbability characteristics rendering the polypeptides useful in cosmetics, is provided which involves preparation of hydrolyzed protein of a Formol Nitrogen Value generally of the order of 4 to 7 through subjecting collagen-containing material to heat in the presence of aqueous solution having sulfite ions present therein under conditions of temperature, pressure and time whereby the gel-forming character of the hydrolyzed protein is at least appreciably reduced, the hydrolyzed protein in solution form is contacted with anion exchange material whereby coloring elements or color precursors are removed and then further hydrolyzing the proteins of reduced gel-forming character with enzymes having proteolytic activity at temperatures in the range between 100° F. and 180° F. to produce polypeptides of Formol Nitrogen Value in the range between about 8 and 17 and heat treating the product of enzyme hydrolysis at temperatures in the range between about 195° F. and 215° F. to arrest the enzyme action.

DISCUSSION OF THE PRIOR ART

In many uses of proteinaceous materials, for example, in cosmetic and pharmaceutical products, the protein additive must be low in color, bland in odor, and low in ash. These requirements can be met by most collagen derivatives such as gelatin. Use of gelatin in, for example, cosmetics, however, generally produces undesirable texture due to high viscosity and stable gel-forming ability.

Modification of the properties of gelatin by hydrolysis has been suggested in Lewis Pat. No. 3,016,334 and Keil et al. Pat. No. 2,431,256. Lewis suggests producing a product useful in skin creams by hot water hydrolysis of proteins from porkskins to obtain material of intermediate ratings, i.e., gel strength (bloom zones) 40 to 80 and millipoise viscosity of 12 to 20 which products have a Formol Nitrogen Value of less than 5.

Keil et al. Pat. No. 2,431,256 teaches hydrolysis of proteins with acids, alkalis and enzymes folowed by pH adjustment of the hydrolyzate to precipitate the higher molecular weight fractions to produce foam stabilizers. Digestion of proteins using the suggested enzyme treatment, i.e., 1% to 4% of papain for from 3 to 24 hours reduces the proteins to amino acids and to polypeptides of molecular weight well below 500, i.e., Formol Nitrogen Value well above 17.

THE PRESENT INVENTION

Now we have discovered that polypeptide material which when used in cosmetics, for example, hair grooming compositions, is capable of sorption into the hair, imparts gloss, renders the hair manageable and acts as a humectant or moisturizer, can be produced by processing collagen to obtain a proteinaceous extract whose components are of a specific molecular weight size range. This processing, for example, may convert collagen directly to a non-gelling material by the one step process of subjecting raw material which contains collagen to high temperatures and pressures in an aqueous system or indirectly by first preparing gelatin and then destroying its gelling character by subjecting it to heat and water, and thereafter the proteinaceous material is hydrolyzed with proteolytic enzymes to the degree required to have a product having a Formol Nitrogen Value in the range between about 8 and 17, characterized by being straight chain polypeptides free of sulfur-containing amino acids and completely soluble in aqueous media over the entire pH range of 1 to 12.

In a preferred embodiment of the invention, the collagen-containing material and associated proteins found in such sources as bones, skins, hides, sinews, fatty tissues, and in specific materials, such as pigs' feet or ossein which are preferred sources of proteins because the end products are clear, more stable solutions having a better odor, is treated in aqueous solution with a sulfite agent to minimize development of color during heating and solubilization and the hydrolyzed protein obtained through treatment with heat and water having a Formol Nitrogen Value of less than 8 and then is subjected to the hydrolysis action of the proteolytic enzyme, papain, to reduce the polypeptides to a mixture of proteinaceous materials having a Formol Nitrogen Value in the specified range, preferably in the range between 9 and 14. In those instances where a light color and bland odor are highly desirable such as in hair grooming compositions, the components present in the hydrolyzed material which cause the solid proteinaceous products to darken during drying and which are responsible for off odors, can be largely removed by solvent extraction with alcohols, by following hydrolysis of the collagen-containing material in the presence of sulfur dioxide with a peroxide treatment for alteration of sulfur compounds or by contacting the product of hydrolysis in the presence of sulfur dioxide with ion exchange materials, either prior to or subsequent to the enzyme hydrolysis, etc.

When processing to obtain non-gelling proteinaceous products, the presence of sulfite radical in solution during the high temperature treatment of the proteinaceous material is desirable because it inhibits development of appreciable color during the processing. Odor and flavor, including residual sulfite taste, and such color or bodies capable of developing color upon subsequent heating, which remain in the heat treated proteinaceous material can be substantially eliminated by, for example, contacting the solution of hydrolyzed proteinaceous material with ion exchange materials prior to or subsequent to enzyme hydrolysis.

In accordance with an embodiment of the invention, given to illustrate a method of preparing the products useful in hair treating compositions, a proteinaceous product of reduced gelling character is derived directly from collagen-containing material and associated proteins found in such sources as bones, skins, hides, sinews, fatty tissues, and the like, by subjecting them to high temperatures and pressures with steam and/or water. Reduction of the proteins to water soluble condition and reduction of the gelling ability of the proteins by heating is carried out in the presence of sulfite ion. Such solubilizing and heating may be carried out in a single heating operation or one in which there is a partial solubilizing in the absence of sulfite ion followed by complete solubilization and/or elimination of gelling character while heating in the presence of sufficient sulfite ion to minimize development of color.

Sulfite ion may be introduced into the aqueous solution of proteinaceous material by dissolving sulfur dioxide gas in the water to form sulfurous acid, by adding water soluble salts of sulfurous acid, and equivalent operations. The amount of sulfite ion required will depend upon the temperature level of the heat treatment and the type of equipment utilized for the cooking operation. Sufficient sulfite must be present so that at least 1000 p.p.m., preferably 2000 p.p.m. (based on solids in solution), remain after the cooking operation to assure obtaining a light colored product. Other conditions being equal, the higher the temperature and the longer the time of heating, the larger the amount of sulfite required. Generally, an amount of sulfite agent is added which is capable of introducing into the solution between 0.1% and 1.5% of sulfite, i.e., $SO_3$ ion on a weight of the solids in solution basis.

Conditions of processing or the type of equipment used will govern the choice of the sulfite agent. Sulfur dioxide, which dissolves in an aqueous solution to form sulfurous acid may be used advantageously in jacketed pressure vessels that are not heated by direct steam because $SO_2$ introduction does not involve the introduction of ash forming cations. When vessels are used which are heated and pressurized by passing steam directly into the mixture, use of sulfur dioxide gas is uneconomic due to loss in the continuously vented gases. When the solutions of proteinaceous matter are to be heated in vented vessels, the common salts of sulfurous acid such as sodium sulfite, potassium sulfite, sodium bisulfite, potassium bisulfite and mixtures thereof are utilized because of their greater stability under the conditions of the pressure cooking.

The extent of the heat treatment required to eliminate the gelling characteristic of the proteinaceous material will vary with the type of collagen-containing raw material and with the type of end product desired. A product with virtually no gel strength can be obtained from most collagenous materials by cooking at 35 pounds to 65 pounds gauge steam pressure, i.e., at temperatures in the range between about 275° F. and 310° F. for from 2 to 5 hours.

More in detail, the process of producing a non-gelling polypeptide product from collagenous material may involve an aqueous leach or acid steep operation prior to heating or cooking of the proteinaceous matter. Such pretreatment steps dissolve salts naturally occurring in the tissues and bones. Discard of the pretreatment solutions eliminates a major portion of the salts which would otherwise carry through the process to the finished product. Polypeptide products produced from leached or steeped collagenous materials, particularly mineral acid steeped materials tend to exhibit greater freedom from turbidity when the solutions thereof are adjusted to or are introduced into another solution where the pH maintained is within the range of about 1.5 to 4.5.

Elimination of salts by steeping sources of collagenous material in hydrochloric acid or sulfuric acid is similar to the process used to produce ossein from animal bones. Following a steep in acid solution, the residual proteinaceous solids, which are to be heat treated in aqueous solution to produce polypeptides of low gelling character, are water washed to remove excess acid, and solubilized mineral material.

Collagen-containing material, subsequent to any steeping or washing treatment is subjected to a heating or cooking to solubilize the collagen. The leached collagenous material is heated in an aqueous medium such as water or dilute acid at temperatures in the range between about 250° F. and 350° F. in the presence of between 0.1% and 1.5% of sulfite ion on a solids content of the solution basis. After cooking, insoluble solids and fat are separated from the water solution. The extract containing heat-hydrolyzed proteinaceous material will contain varying amounts of residual sulfite depending upon the amount of sulfurous acid or salts thereof utilized and the type of processing equipment used. The extract will usually have, in 1% solution, a Lovibond color in the range between yellow 1 to 4 and red 0.2 to 1.2 whereas a solution cooked in the absence of sulfite ion will generally show in 1% solution a Lovibond color in the range of yellow 5 to 8 and red 1.6 to 3.0.

Inasmuch as the extracts are dilute solutions, it may be preferable at this stage to effect a partial concentration. Extract solutions are generally concentrated by evaporation of water to a solids content of between 20% and 55% by weight, preferably between about 35% and 50%. This preliminary concentrate may have suspended matter removed therefrom, for example, by mixing with filter aid and then filtering the resultant slurry through a pre-coated filter to obtain a substantially fat and insoluble solids-free solution of non-gelling proteinaceous material.

Clarified concentrate of non-gelling proteinaceous product is adjusted to the optimum range of acidity for enzyme action, i.e., to a pH in the range between 5 and 8. A solution of proteolytic enzyme, for example, a 10% to 25% by weight solution of papain, is added to produce a digestion solution containing from about 0.1% to 0.5% papain based on the weight of solids in solution. The solution is maintained at a temperature in the range between about 100° F. and 180° F., preferably between about 140° F. and 170° F. and the end point determined by the conventional Formol Nitrogen test. Depending upon the average molecular weight of the proteins desired, the digestion is continued until a Formol Nitrogen value in the range between about 8 and about 17 is obtained and preferably when the intended used of the products is in cosmetics where it is applied to hair, in the range between about 9 and 14. Suitable proteolytic enzymes for the purposes of this invention are papain, bromelin, ficin, trypsin, and the like.

Products of Formol Nitrogen Value in the range of about 8 to 17, having the properties described, when the molecular weight is determined in accordance with standard procedures, will have a number average molecular weight in the range between about 500 and 1500.

To terminate the enzyme action, the solution is heated to an enzyme deactivating temperature, generally to a temperature in the range between about 195° F. and 215° F. for an appropriate length of time, for example, 15 to 30 minutes.

After enzyme hydrolysis, the concentrate of polypeptides is a solution having a pH generally in the range between about 5.7 and 6.7. The concentrate is contacted with material containing groups capable of ion exchange, i.e., anion exchange alone or cation and anion exchange together irrespective of the order of treatment. The liquid product of ion exchange with anionic material generally will have a pH in the range between about 4.5 and 5.5. The hydrogen ion concentration of the ion exchanged concentrate is adjusted, if necessary, using organic acids such as citric acid to produce a pH in the range between about 4.5 and 7, preferably between about 5.5 and 6.5, and the product may, if desired, be dehydrated. After enzyme hydrolysis, the extract may be diluted or may be passed as a concentrate directly to ion exchange apparatus.

Non-darkening non-gelling proteinaceous products are produced through the removal of whatever elements may be responsible for darkening by suitable means such as ion exchange. Suitable anionic exchange materials are those known to the trade as Amberlite IR-45, weak base primary amine, Amberlite IR-402, strong base quaternary ammonium hydroxide, Duolite A-30T, intermediate base tertiary amine, and the like. Since anion exchange resin treatment results in removal of acidic ions, the solution becomes more alkaline. A slight darkening of the solution occurs due to the pH increase. However, since the pH of the solution at this stage of processing is too high for most applications, it is necessary to lower the pH with acid, preferably phosphoric or citric, prior to drying. Upon lowering of the pH, the solutions become lighter in color. Lovibond color readings of solutions entering and leaving the anion resin vessel, when measured at slightly acid pH value, show virtually no change. However, the Lovibond color method lacks the sensitivity necessary to measure small color differences. Evidence of removal of color and color precursors by the resin is shown by the highly colored resin eluate that is obtained during regeneration of the resin with alkali.

If a low ash product is desired, treatment with various combinations of anionic and cationic resins can be used. The preferred combination for treatment is contact first with an anionic exchange resin of weak base strength properties followed by treatment with a strong acid resin such as Amberlite IR-120 H which combination can reduce the ash content of the final product produced from the solution having an approximately 2.2% ash content to approximately 0.03%.

While extract solutions maintained at temperatures above about 45° F. can be passed through the ion exchange beds, it is preferable to effect the ion exchange when the solutions are at a temperature in the range between about 150° F. and 200° F. Warm solutions generally are pumped through the ion exchange bed under a pressure of about 25 to 50 pounds gauge.

Contact time of the protein solution with the resin influences the quality of the final product, especially with regard to odor, when the dried product is made un into solution.

For example, when a 40% solution of filtered material obtained by processing pigs' feet is passed through a vessel containing 2 cubic feet of resin at a rate of 1 gallon per minute, the pH of the effluent is 8.5. When a sample of the solution is adjusted to 5.5, the solution has a slightly unpleasant odor. When a similar procedure was used, i.e., a procedure differing only in that the material was passed through the resin vessel at a rate of one-half gallon per minute, solutions of the dried material are substantially odorless.

In the use of such exchange resins as are referred to above, regeneration is carried out using regenerants and techniques recommended by the resin manufacturer.

Proteinaceous compositions obtained from collagen-containing materials having a Formol Nitrogen Value in the range between about 8 and 17 which which corresponds roughly to a molecular weight in the range between about 500 and 1500 when added to hair treatment formulations such as shampoos, bleaches, dyes, waving lotions, and the like, in amounts in the range between about 5% and 60% by weight of the compositions, provide striking differences in cleaning, manageability, modification of damaged hair, and protection against destructive effects of chemical agents.

Proteinaceous materials, i.e., polypeptides of Formol Nitrogen Values, for example, in the range of 4 to 7 and in the range of 18 to 20, i.e., polypeptides of molecular sizes outside the range of 8 to 17, do not impart the unique properties exhibited by the products of this invention. While we do not wish to be tied to a theory, it appears and the hereinafter set forth examples support the theory that the difference in the treatment of hair is the permanency of the bonding of polypeptides of this invention to the hair into which it is absorbed. Polypeptides of relatively large molecular weight compared to applicants' product, i.e., Formol Nitrogen Values of 3 to 7, exhibit temporary adsorption to the surface of hair, are not absorbed to any significant extent and show a lack of bonding to the hair by having a substantial portion thereof removed from the hair simply by rinsing. Polypeptides of relatively smaller molecular weight compared to applicants' products, i.e., of Formol Nitrogen Values of 18 or higher, exhibit temporary absorption into the hair but show a significantly reduced amount of bonding to the hair by being desorbed in significant amounts during rinsing.

The instant proteinaceous compositions provide effective action because they are absorbable and significant amounts thereof remain absorbed permanently into the hair, facts establishable due to the presence of a characterizing chemical, hydroxyproline, an amino acid not present in proteinaceous material derived from sources other than collagen-containing materials.

When hair is cleaned and dried and the hair is treated with an aqueous solution containing the polpeptides of the invention, sorption, in general, increase with increase in concentration of the polypeptides, increased with decrease in molecular size of the peptides and increases with increase in damage to hair, i.e., the least amount of polypeptide is sorbed to virgin hair, more is sorbed by bleached hair and still larger amounts are sorbed to hair treated with chemical waving agents.

The invention is further understood from the following examples which are given by way of illustration and without any intention that the invention be limited thereto.

EXAMPLE I

Eighteen thousand pounds of ground pigs' feet are steeped in cold water for two hours. The water is drained off and ground feet covered with water a second time and then again drained. The feet are then covered with cold water which contains 25 pounds of sulfur dioxide gas, and after steeping the ground feet overnight, this solution is drained off.

A calcium bisulfite solution is then prepared by passing liquid $SO_2$ into a slurry of 27 pounds of calcium carbonate until the solution becomes clear. This solution, plus enough hot water to cover the ground feet, is then added to the container containing the leached ground feet. The material is then cooked with steam at 40 pounds gauge pressure (287° F.) for two hours.

After cooking, the melted fat is drawn off and the aqueous layer is removed. A second cook is then carried out, with added water at 5 pounds pressure, for one-half hour. This liquid extract is removed and combined with the first cooked water extract and evaporated to 55% solids. Approximately 3850 pounds of concentrated material is obtained. The material was filtered and split into portions A, B, C and D.

To portion A of the extract solution which had Formol Nitrogen of 5.6% and a pH of approximately 6 was added 10 pounds of a solution containing 10% by weight papain so as to produce hydrolysis solution having a papain content of approximately 0.2% based upon solids in solution. The solution was held at 140° F. for a total of 19 hours, following which the solution was heated to 200° F. to deactivate the enzyme. At the end of that time the Formol Nitrogen Value of the digest was 11.2%.

This enzyme treated extract is filtered and passed through a tower containing approximately 12 cubic feet of anionic exchange resin. After flow of liquid is passed through the tower at a rate of 2 gallons per minute, the pH of a composite sample of the effluent is 8.7. The $SO_2$ content in p.p.m. on a solids basis is less than 100. After adjustment of the pH to 5.5 with citric acid, the extract is reconcentrated to 55% solids. A 1% solution of this material has a Lovibond color of 1.0 yellow, 0.0 red. Solutions of the material are substantially free of odor and flavor.

EXAMPLE II

To portion B of the liquid product of Example I was added approximately 10 pounds of the same 10% solution of papain, so as to produce a hydrolysis solution having a papain content of approximately 0.2% based upon solids in solution. A digest of the enzyme containing extract was carried out at a temperature of approximately 170° F. for approximately 1 hour and the enzyme deactivated. Formol Nitrogen Value of the digest was 9.0. After digestion, the solution was passed through a tower containing approximately 12 cubic feet of anionic exchange resin, at a rate of 2 gallons per minute. The pH of the composite same of the effluent is approximately 8.7. The pH of the solution adjusted to 5.5 with citric acid has, measured at 1% solution, a Lovibond color of 1.0 yellow/0.0 red.

EXAMPLE III

Portion C of the liquid product of Example I was diluted to 40% solids, was filtered and the solution was passed through a tower containing approximately 4 cubic feet of anionic exchange resin. The pH of the solution was adjusted to 6.0 with citric acid and approximately 10 pounds of the 10% solution of papain added. A digest of the enzyme containing extract was carried out at a temperature of about 140° F. for approximately 19 hours. Formol Nitrogen Value of the digest at the end of one hour was 10.9, at the end of two hours was 11.3, and at the end of 10 hours was 12.6. The product of 10 hours digestion was heated to deactivate the enzyme and the solution reconcentrated to 55% solids.

EXAMPLE IV

Portion D of the liquid product of Example I, which has a pH of approximately 6 was diluted to 40% solids, was filtered and was passed through a tower containing approximately 4 cubic feet of anionic exchange resin and then through a tower containing approximately 4 cubic feet of cationic exchange resin. After portion D has passed through the tower at the rate of 2 gallons per minute, the pH of a composite sample of the effluent is approximately 5.5.

To this ion-exchanged extract is added approximately 17.5 pounds of papain in a 10% solution so as to produce in the extract a papain content of 0.35% and approximately 0.1% of methyl paraben plus 0.016% propyl paraben.

The enzyme containing material was held at a temperature of 140° F. for a total of 19 hours. The Formol Nitrogen Value of the digest at one-half hour was 9.5, at 1 hour 11.2, at 3 hours 12.9 and at 19 hours 17.

The products as prepared above may be incorporated in aqueous solutions in various forms including aqueous and aqueous-alcoholic solutions, emulsions, creams, lotions, and the like. They may consist of one or more phases at least one of which must be aqueous. For instance, the hair preparation may consist of a single aqueous or aqueous-monohydric or polyhydric alcohol phase or may comprise an aqueous and a separate oily phase as in two layer systems or emulsions of the water in oil or oil in water type. The proteinaceous material of this invention may be present in said composition in amounts in the range between about 5% and about 60% by weight.

We claim:

1. A method of preparing light colored water-soluble polypeptide materials free of objectionable odor which comprises heating collagen-containing material in the presence of an aqueous solution to effect extraction of proteins therefrom and hydrolysis of the extracted proteins, said solution containing sulfite ion in solution in an amount in the range between about 0.1% and about 1.5% on a basis of weight of the solids in solution at a temperature in the range between about 250° F. and 350° F. for a period in the range between 2 and 5 hours whereby the gel-forming character of the heat hydrolyzed proteins in the solution is at least reduced, and without regard to order further hydrolyzing the solution of heat hydrolyzed proteins by mixing therewith enzymes having a proteolytic activity and maintaining the temperature of the mixture in the range between 100° F. and 180° F. until the Formol Nitrogen Value of the mixture is in the range between about 8 and 17 and heat treating the resultant enzyme-treated solution at a temperature in the range between about 195° F. and 215° F. to terminate the enzymes action and contacting the aqueous solution of hydrolyzed proteins with material containing groups capable of anion exchange for removal of color and color precursors.

2. The method according to claim 1 wherein the Formol Nitrogen Value is the range between about 9 and 14.

3. The method according to claim 1 wherein the collagen-containing material is subjected to heat at temperatures in the range between 250° F. and 350° F. and at steam pressures in the range between about 35 pounds and 65 pounds.

4. The method according to claim 1 wherein the hydrolyzed protein solution is subjected to anion exchange while at a temperature in the range between 150° F. and 200° F.

5. The method according to claim 1 wherein the treatment with material containing groups capable of anion exchange is applied to the aqueous solution of heat hydrolyzed proteins before hydrolysis with enzmes having proteolytic activity.

6. The method according to claim 5 in which the heating of collagen-containing material is in an aqueous solution containing calcium bisulfite and the enzyme mixed with the anion exchange treated solution is papain.

7. The method according to claim 1 wherein the aqueous solution of heat hydrolyzed proteins after treatment with material containing groups capable of anion exchange is also treated with material capable of cation exchange and after hydrolysis of the aqueous ion exchange treated solution of heat hydrolyzed proteins with enzymes having proteolytic activity, the polypeptide material is recovered from the solution as a dry product.

References Cited

UNITED STATES PATENTS 3,475,404  10/1969  Johnsen et al. _____ 260—123.7

RAYMOND N. JONES, Primary Examiner

U.S. Cl. X.R.

260—123.7; 424—62, 70, 71, 359, DIGEST 2